Jan. 12, 1960     J. M. FREIBERG     2,920,422
APPARATUS FOR SUPPORTING A GLASS SHEET
Filed Jan. 22, 1957     2 Sheets-Sheet 1

*INVENTOR.*
*JAMES M. FREIBERG*
BY
Oscar L. Spencer
ATTORNEY

Jan. 12, 1960 J. M. FREIBERG 2,920,422
APPARATUS FOR SUPPORTING A GLASS SHEET
Filed Jan. 22, 1957 2 Sheets-Sheet 2
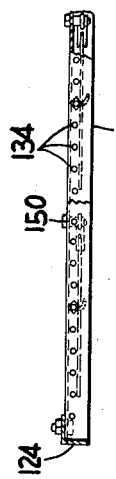
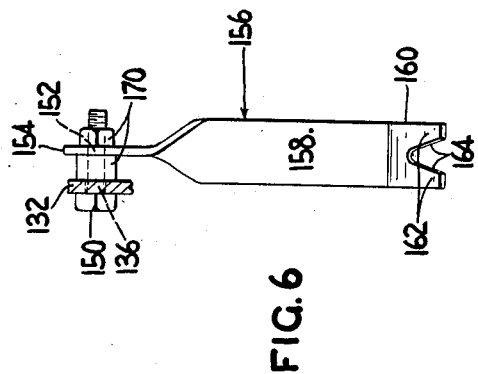
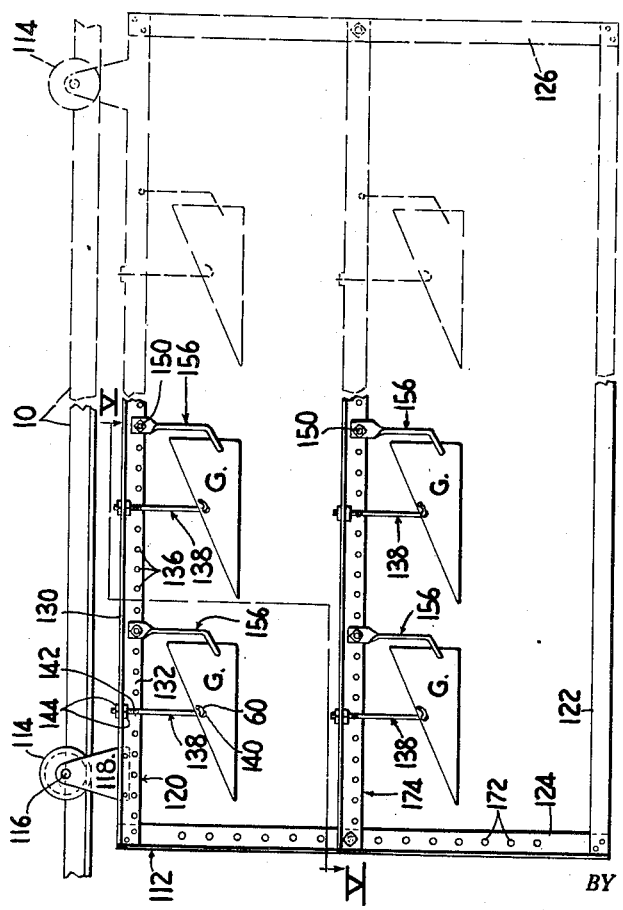
INVENTOR.
JAMES M. FREIBERG
BY
Oscar L. Spencer
ATTORNEY

United States Patent Office

2,920,422
Patented Jan. 12, 1960

2,920,422

APPARATUS FOR SUPPORTING A GLASS SHEET

James M. Freiberg, New Kensington, Pa., assignor to Pittsburgh Plate Glass Company, Allegheny County, Pa., a corporation of Pennsylvania Application January 22, 1957, Serial No. 635,155

6 Claims. (Cl. 49—45)

This application relates to treating glass, and particularly concerns the tempering of precut apertured glass sheets.

In tempering glass sheets, it has been customary to convey the sheets to be tempered by means of tongs suspended from carriages mounted on overhead rails. The tongs grip the glass sheets adjacent their upper edges while the carriages are transported through a heating lehr where the glass sheets are heated above the annealing range of the glass and below its melting point. When the glass attains the desired temperature, the carriage is moved to a second station where the glass sheets are subjected to opposing blasts of tempering fluid, such as air under pressure.

The purpose of first heating and then suddenly chilling the glass surfaces is to impart a desired stress pattern to the glass sheet so that the surfaces of the sheet are in compression and the interior of the sheet is in tension. Glass provided with such stress patterns is able to withstand the application of forces that would fracture glass not subject to such violent stress patterns, such as annealed glass.

In handling glass sheets for the tempering operation, tongs have been used to grip the sheets adjacent their upper extremities. The use of such tongs has made the timing cycle for heating and chilling of very great importance, because if the glass is maintained at substantially its softening temperature for any extended period, on the order of seconds, while gripped by tongs, tong marks are impressed in the surfaces of the glass, thus impairing its optical properties. Other defects resulting from the use of tongs include impairment of the stress pattern in the region of the supported sheet adjacent each supporting tong because of the localized pressures applied by the tongs so that the resistance of the tempered glass sheet to fracture upon impact is reduced. Also, the glass is likely to be scratched if careless personnel handle the tongs, thus providing origins of damages resulting in rejects.

The advent of 1957 automobile models introduced a novel problem of tempering glass sheets that have apertures for the installation of hardware. The triangular and irregular quadrilateral shapes of these apertured ventilator lights made the problem of supporting such lights for tempering a difficult one to solve.

If the glass sheets are supported horizontally on skeletal supports, they tend to sag during heating unless their intermediate areas are properly supported. The use of intermediate supports necessitates rapid removal of the intermediate supports between the heating and quenching steps required for tempering. In addition, the intermediate portion of the glass surface is likely to develop blemishes because of its contact with any intermediate support provided at elevated temperatures.

If the glass sheets are supported vertically, the tendency for the glass sheets to sag intermediate the edges, which is present during the horizontal supporting techniques described above, is minimized. However, supporting the sheets vertically for tempering by tongs introduces the problem of surface marring mentioned above. The present invention provides a novel apparatus for providing vertical support for apertured glass sheets to be tempered without requiring the use of tongs.

The present invention has been made despite numerous warnings of dire consequences from persons skilled in the art when it was first suggested. The results of experiments performed in the face of these gloomy forecasts proved the practicability of the invention so conclusively that it was employed immediately in large scale mass production.

The present invention provides an apparatus for tempering apertured ventilator lights involving supporting the ventilator lights by the use of metal hooks extending through the apertures to provide a pivotal support for the lights. Balancing members are also provided to prevent rotation of the lights about the pivot axis at the bearing contact between the hook and the aperture and about any pivot axis in the plane of the light. The drilled aperture represents the weakest portion of the glass sheet and it was feared that using metal hooks extending through the apertures would increase the frequency of production failures. These fears were found to be groundless when the cross-sectional area of the hooks is smaller than the aperture so as to permit free flow of tempering fluid against the periphery of the aperture.

The present invention will be better understood after studying the description of particular embodiments of the present invention which follows. Drawings containing like reference numerals for identical structural elements are included to illustrate the invention described.

In the drawings referred to in the description of the various structures illustrating the present invention:

Figure 4 is a fragmentary side elevation of an alternate embodiment of the present invention.

Figure 5 is a view looking along lines V—V of Figure 4.

Figure 6 is a perspective view of an element of the embodiment of Figures 4 and 5.

Figure 1:
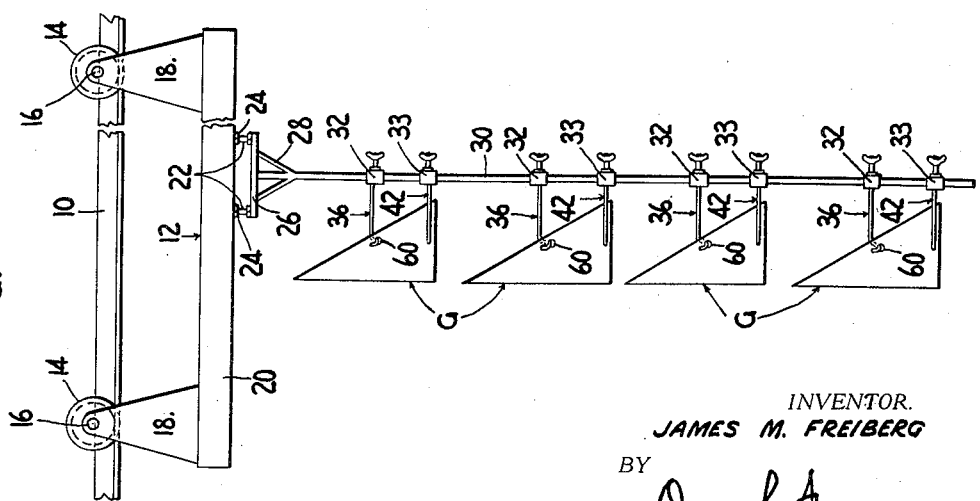
Figure 1 is a fragmentary side elevational view of a portion of an apparatus following the teachings of the present invention.

Referring to the drawings, Figure 1 shows an overhead monorail 10 along which carriages 12 are conveyed through a heating furnace and blowing chamber sequentially. The details of the tempering furnace are not illustrated to simplify the illustration of the present invention. Each carriage 12 comprises wheels 14 rotatable about axles 16 carried by brackets 18. A main frame 20 consisting of a U-shaped bar interconnects the bottoms of the brackets 18.

Posts 22 depend from the main frame 20 to support at least one cross arm 26. Each cross arm supports brace rods 28 which extend obliquely downwardly therefrom and a depending rod 30 which extends vertically downwardly. The oblique brace rods 28 interconnect cross arm 26 with depending rod 30. In case it is desired to make rods 30 displaceable, the upper portions of rods 22 are externally threaded and threaded nuts 24 are rotatably mounted on the posts 22 to help secure the latter to the frame 20. The size of the lights to be tempered dictates the number of rods 30 that can be carried by each carriage.

A plurality of sleeves 32 and 33 are mounted on each vertically depending rod 30. Wing nuts 34 extend through threaded apertures of each sleeve to lock the latter in position upon the vertically extending depending rod 30.

A hook member 36 extends horizontally from each alternate sleeve 32 mounted on the rod 30. The hook member comprises a straight portion 37 extending horizontally from its point of attachment to sleeve 32 in a direction opposite the wing nut 34. Straight portion 37 terminates in a horizontally turned corner 38 that extends into a downwardly extending portion 39 that terminates in a U-shaped hook 40.

Each sleeve 33 is provided with a hair pin like balancing structure 42 comprising spaced, flexible springs 44 extending horizontally in substantial alignment with straight portions 37 of hook members 36. The springs are constructed so that their facing surfaces are concavely shaped at 46 intermediate their extremities and then convexly shaped at 48 adjacent their free extremities 50. The spacing between the springs 44 at portions 46 is made relatively wide to facilitate the flow of tempering fluid between the springs and the glass surfaces. The springs are curved between portions 46 and portions 48 in such a manner that they make point contacts with opposing glass surfaces at portions 48 where their spacing is at a minimum.

When glass sheets G are mounted for tempering, sleeves 32 are adjusted vertically along rods 30 at such a spacing that a U-shaped hook 40 is threaded through an aperture 60 in each sheet. Sleeves 33 are adjusted vertically intermediate sleeves 32 so that portions 48 of springs 44 make point contact with each sheet G at a distance from the bottom edge of the sheet within a tolerance dictated by the width of a frame within which the light of glass is to be installed.

The U-shaped hook 40 provides a bearing support at the uppermost portion of the periphery of the aperture 60 of the light. Thus, substantially the entire weight of each light G is supported by an individual hook 40. The springs 44 merely maintain the lights in their proper vertical plane, and prevent rotation about two mutually perpendicular horizontal axes, and provide substantially no support to bear their weight.

Referring to Figures 4, 5 and 6, another embodiment of the present invention is shown. In this embodiment, a carriage shown generally as reference numeral 112 is suspended from the overhead rail 10 through wheels 114 rotatable about axles 116 that are carried by brackets 118, similar to the wheels 14, axles 16 and brackets 18 of the earlier embodiment. The carriage is in the form of a frame and includes an upper angle iron 120 and a lower angle iron 122 interconnected by vertically extending angle irons 124 and 126. Upper angle iron 120 comprises a horizontally extending flange 130 and a vertically extending flange 132. Horizontal flange 130 is apertured at 134 (Figure 5), while vertical flange 132 is apertured at 136 (Figure 4). A hook 138, provided at its lower extremity 140 with a U-shaped portion, is externally threaded at its upper extremity 142 to receive a pair of nuts 144 which adjust hook 138 vertically and secure it in fixed relation relative to flange 130 of the upper angle iron 120.

Apertures 136 are located to receive bolts 150 which are threaded therethrough. Bolt 150 also extends through an aperture 152 in a twisted upper extremity 154 of a balancing member 156. The balancing member 156 also comprises a main portion 158 extending from the twisted upper extremity. At its lower extremity, the main portion 158 is bent at an obtuse angle to form a bifurcated lower portion 160. The bifurcated portion 160 comprises a pair of tongues 162 whose inner surfaces 164 are cut away at acute angles relative to each other. Thus, when glass sheets G are hooked at their apertures 60 upon hooked ends 140 of the hooks 138, the sheets are free to pivot about the bearing axis formed between the hook and the upper surface of the aperture 60.

Balancing members 156 are rigidly secured to flange 132 by means of the bolts 150 and nuts 170. Thus, the mass of each glass panel G rests upon the U-shaped end 140 of the hook member 138 and the sheet G would be free to rotate were it not for the location of the balancing member 156. The acutely angled edges 164 make point contacts at the edge of the glass sheet G to inhibit rotation of the panel about the pivot point provided at its aperture 60. Thus, there are in effect three points of contact between the glass panel and supporting elements, one at the hook 140 and two at the diverging surfaces 164 of the balancing member 156, thus causing the panel to be balanced vertically during the tempering operation.

The size of the glass panels permitting, a large number of them can be supported upon a single carriage 112. For this purpose, angle irons 124 and 126 are apertured at 172. These apertures 172 facilitate the fastening of additional horizontally extending angle irons between the vertically extending angle irons 124 and 126. An additional angle iron is shown in Figure 4 at 174.

Figure 3:
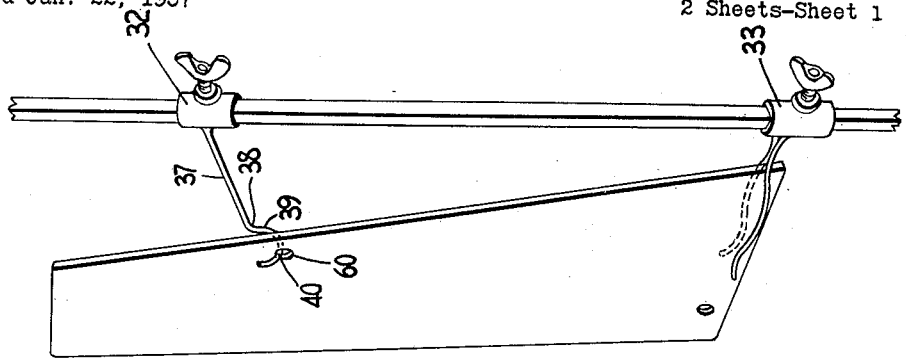
Figure 3 is a view similar to Figure 2 showing how the apparatus of Figure 1 is adjusted to support a different shape of ventilator light for treatment.
Figure 2:
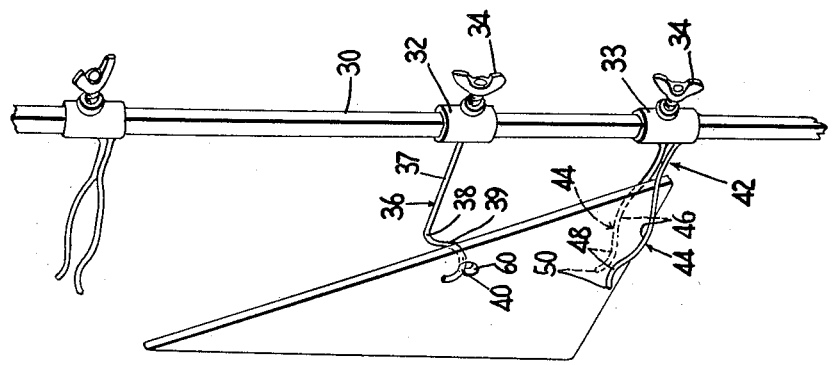
Figure 2 is an enlarged perspective view of the apparatus of Figure 1 showing how the apparatus is utilized in supporting triangular glass sheets for tempering.

From production experience, it has been found that a hook member having a diameter on the order of ⅛ inch has sufficient structural rigidity to support apertured ventilator panels of polished plate glass having a nominal thickness of ¼ inch, a height of 13¾ inches, a graduation in width from 3¼ inches at its top to 5¼ inches at its bottom and an outline such as shown in Figure 3. Using hook members 36 of such dimensions provides tolerable stress patterns when used in conjunction with ¼ inch diameter holes spaced a minimum of ¼ inch from a panel edge. However, larger apertures spaced greater distances from the panel edge provide more desirable results. Also, experimental test results indicate the desirability of drilling holes by means of drilling equipment using supersonic methods, since apertures drilled with the aid of supersonic equipment have clean, smooth wall surfaces and form smooth seams at the corners of the walls of the apertures and the surfaces of the panel.

The various embodiments of the present invention have been described for purposes of illustration rather than limitation. Reference to the latter may be had by reference to the accompanying claims.

What is claimed is:

1. Apparatus for supporting an apertured glass sheet during thermal treatment comprising a carriage, a hook member and a balancing member secured to said carriage in spaced relation to each other, said hook member providing bearing support contact for said glass sheet through its aperture and said balancing member providing two opposing adjacent points of engagement for the glass sheet at locations spaced from said aperture.

2. Apparatus according to claim 1, wherein the cross-sectional area of the hook member is less than that of the aperture to permit free flow of tempering fluid against the periphery of the aperture.

3. Apparatus for supporting an apertured glass sheet during thermal treatment comprising a carriage, a rod depending vertically from said carriage, a hook member adjustably mounted to said rod and provided with a hook adjacent its free end for extending through an aperture of said apertured sheet and a balancing member below said hook member and adjustably mounted to said rod and provided with spaced curved springs spaced apart a minimum distance on the order of the thickness of the sheet to be treated.

4. Apparatus for supporting an apertured glass sheet during thermal treatment comprising a carriage, a rod depending vertically from said carriage, a hook member adjustably mounted to said rod and provided with a hook adjacent its free end for extending through an aperture of said apertured sheet and a balancing member below said hook member and adjustably mounted to said rod and provided with spaced curved springs shaped as mirror images of each other, each spring having a concavely curved surface portion spaced from the corresponding portion of the other spring a relatively large distance and a convexly curved surface portion spaced from the corresponding portion of the other spring a distance on the order of the thickness of the sheet to be treated.

5. Apparatus for supporting an apertured glass sheet during thermal treatment comprising a carriage, a rod depending vertically from said carriage, a hook member adjustably mounted to said rod and provided with a hook adjacent its free end for extending through an aperture of said apertured sheet and a balancing member below said hook member and adjustably mounted to said rod and provided with spaced curved springs spaced apart a minimum distance on the order of the thickness of the sheet to be treated and additional hook members and balancing members alternately carried in adjustable position along said rod.

6. Apparatus for supporting an apertured glass sheet during thermal treatment comprising a carriage, an apertured beam member secured to said carriage, a hook member adjustably secured at one end to said beam member, a balancing member adjustably secured at one end to said beam member in spaced relation to said hook member, said hook member having a hook at its unsupported end providing bearing support contact for said glass sheet through its aperture and said balancing member having a bifurcated portion at its unsupported end with diverging opposed sides separated by a varying distance ranging from less than the glass thickness to more than the glass thickness to make point contact at two opposite points along an edge of the hook-supported glass sheet.

References Cited in the file of this patent

UNITED STATES PATENTS

| | | | |
|---|---|---|---|
| 504,729 | Keller | Sept. 12, | 1893 |
| 1,521,592 | Belke | Jan. 6, | 1925 |
| 1,773,373 | Raymond | Aug. 19, | 1930 |
| 2,025,086 | Black | Dec. 24, | 1935 |
| 2,122,088 | Clitherow | June 28, | 1938 |
| 2,180,737 | Hess | Nov. 21, | 1939 |
| 2,297,181 | Weihs | Sept. 29, | 1942 |
| 2,328,404 | White | Aug. 31, | 1943 |
| 2,343,490 | White | Mar. 7, | 1944 |
| 2,606,666 | Gray | Aug. 12, | 1952 |